US012798479B2

(12) United States Patent
Svedberg

(10) Patent No.: US 12,798,479 B2
(45) Date of Patent: Nov. 17, 2026

(54) CLADDING PART, METHOD FOR HOMOGENIZING A LIGHT INTENSITY OF AT LEAST TWO LIGHT GUIDES, AND VEHICLE

(71) Applicant: Bayerische Motoren Werke Aktiengesellschaft, Munich (DE)

(72) Inventor: Fredrik Svedberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/146,040

(22) PCT Filed: Jan. 30, 2024

(86) PCT No.: PCT/EP2024/052117
§ 371 (c)(1),
(2) Date: Jul. 7, 2025

(87) PCT Pub. No.: WO2024/165367
PCT Pub. Date: Aug. 15, 2024

(65) Prior Publication Data

US 2026/0225520 A1 Aug. 6, 2026

(30) Foreign Application Priority Data

Feb. 9, 2023 (DE) ..................... 10 2023 103 107.4

(51) Int. Cl.
*B60Q 3/62* (2017.01)
*B60Q 3/217* (2017.01)
(Continued)

(52) U.S. Cl.
CPC ............... *B60Q 3/62* (2017.02); *B60Q 3/217* (2017.02); *B60Q 3/54* (2017.02); *B60R 13/0243* (2013.01);
(Continued)

(58) Field of Classification Search
CPC . G02B 6/001; G02B 6/02; G02B 6/04; B60Q 3/54; B60Q 3/62; B60Q 3/217; D03D 15/547
See application file for complete search history.

(56) References Cited

U.S. PATENT DOCUMENTS 4,234,907 A 11/1980 Daniel
2017/0095043 A1 4/2017 Weber et al.
(Continued)

FOREIGN PATENT DOCUMENTS

DE 10 2012 215 165 A1 2/2014
DE 10 2013 020 715 A1 6/2015
(Continued)

OTHER PUBLICATIONS

Machine translation of DE 2021213244 to Musy, published May 25, 2023 (Year: 2023).*
(Continued)

*Primary Examiner* — William N Harris
(74) *Attorney, Agent, or Firm* — Crowell & Moring LLP

(57) ABSTRACT

A cladding part for a vehicle has a decorative layer with at least two light guides into which light can be coupled. Each light guide, in a visible region of the decorative layer, has n first light exit regions for the exit of the coupled-in light and, in a non-visible region of the decorative layer, n second light exit regions for the exit of the coupled-in light. The number of first and second light exit regions of a first light guide is equal to the number of first and second light exit regions of a second light guide, or the number of first and second light exit regions of the first light guide is slightly smaller or larger than the number of first and second light exit regions of the second light guide.

12 Claims, 3 Drawing Sheets

(51) Int. Cl.

| | |
|---|---|
| ***B60Q 3/54*** | (2017.01) |
| ***B60R 13/02*** | (2006.01) |
| ***D03D 15/547*** | (2021.01) |
| ***F21V 8/00*** | (2006.01) |
| ***G02B 6/02*** | (2006.01) |

(52) U.S. Cl.

CPC ........... *D03D 15/547* (2021.01); *G02B 6/001* (2013.01); *G02B 6/02* (2013.01)

(56) References Cited

U.S. PATENT DOCUMENTS

| | | | | |
|---|---|---|---|---|
| 2017/0217366 | A1 | 8/2017 | Kraemer et al. | |
| 2017/0297484 | A1* | 10/2017 | Yamada | B60Q 3/217 |
| 2018/0340272 | A1* | 11/2018 | Yamada | G02B 6/0005 |
| 2022/0126749 | A1* | 4/2022 | Brandl | B60Q 1/0035 |

FOREIGN PATENT DOCUMENTS

| | | | | |
|---|---|---|---|---|
| DE | 10 2016 207 693 | A1 | 11/2017 | |
| DE | 10 2017 100 754 | A1 | 7/2018 | |
| DE | 102021213244 | A1 * | 5/2023 | D03D 15/547 |
| EP | 3 878 693 | A1 | 9/2021 | |
| JP | 2019-108647 | A | 7/2019 | |

OTHER PUBLICATIONS

International Search Report (PCT/ISA/210) issued in PCT Application No. PCT/EP2024/052117 dated Apr. 10, 2024 with English translation (5 pages).

German-language Written Opinion (PCT/ISA/237) issued in PCT Application No. PCT/EP2024/052117 dated Apr. 10, 2024 with English translation (9 pages).

German-language Search Report issued in German Application No. 10 2023 103 107.4 dated Oct. 26, 2023 with partial English translation (13 pages).

* cited by examiner

CLADDING PART, METHOD FOR HOMOGENIZING A LIGHT INTENSITY OF AT LEAST TWO LIGHT GUIDES, AND VEHICLE

BACKGROUND AND SUMMARY

The present invention relates to a cladding part, in particular for a vehicle, which comprises at least one decorative layer having at least two light guides into which light can be coupled, wherein each light guide comprises n first light exit areas for the exit of the coupled-in light in a visible area of the decorative layer. Furthermore, the invention relates to a method for homogenizing a light intensity of at least two light guides, which can be incorporated into a decorative layer of such a cladding part, and a vehicle having at least one such cladding part.

For aesthetic reasons, an interior of a vehicle is provided with cladding parts. Cladding parts made of a textile and comprising light guides are increasingly used for this purpose. The light guides illuminate the textile, by which an additional optical effect is achieved in the interior. The light guides are woven into the textile, bundled, and connected to a light source, for example, an LED module.

The light source brings light into each individual light guide, and the light runs axially in the interior of the light guide, as with glass fibers. The light visible in the textile exits radially from the light guides here. The light can exit from the light guide in two different ways. In a first variant, the light is emitted along the entire fiber length in the radial direction. Such light guides are referred to as "side emitting fibers".

One example of a luminous textile having "side emitting fibers" is disclosed in DE 10 2013 020 715 A1. The luminous textile consists of at least one layer made up of warp and weft threads, wherein at least one light source couples light frontally into the luminous textile and the light is emitted from the luminous textile at an angle to the longitudinal extension of the light-guiding element, for example, the thread, wherein a light decoupling structure for more targeted reflection of the light consists of reflector elements which are arranged in a distributed manner and are adhesively connected on at least one side of the surface of the luminous textile to the light-guiding elements, for example, the threads, of the luminous textile.

In a second variant, the light guide comprises an opaque coating, which is referred to as "cladding" and which prevents the light from exiting along the entire length of the light guide, but rather only where the coating has been removed. The removal of the coating is referred to as activation and is typically carried out by way of mechanical machining, for example, sandblasting, or by way of thermal machining, for example, by way of laser.

DE 10 2016 207 693 A1 discloses a method for producing a cladding part for a vehicle. During the production of the cladding part, a large number of light guides are woven into a fibrous decorative layer. Superficial material of the fibrous decorative layer is then removed in specific decorative areas. Fibers of the fibrous decorative layer are superficially removed here and light guides are slightly and intentionally damaged, so that edge-emitting sections result thereon. Light coupled into the light guides can then exit from the edge-emitting sections and thus cause the luminescent decoration to luminesce.

Since the light source couples an equal amount of light into each light guide, upon the activation, the light intensity is dependent on the number of the activated light spots per light guide, i.e. on the number of the activated or removed surfaces. This means that a pattern in the textile which is not identical everywhere results in a different number of light exit points and therefore displays an inhomogeneous light picture. As a result, some light spots luminesce more strongly than others.

The present invention is based on the object of providing a cladding part, a method, and a vehicle which have a homogeneous light picture.

To achieve the object, a cladding part having the features of claim 1, a method having the features of claim 8, and a vehicle having the features of claim 10 are proposed.

Advantageous embodiments of the cladding part and the method are the subject matter of the respective dependent claims.

According to a first aspect of the invention, a cladding part, in particular for a vehicle, is proposed. The cladding part comprises at least one decorative layer having at least two light guides into which light can be coupled, wherein each light guide comprises n first light exit areas for the exit of the coupled-in light in a visible area of the decorative layer and comprises n second light exit areas for the exit of the coupled-in light in a nonvisible area of the decorative layer, wherein the number of first and second light exit areas of one light guide is equal to the number of first and second light exit areas of the other light guide, or wherein the number of first and second light exit areas of one light guide is slightly less or greater than the number of first and second light exit areas of the other light guide.

The invention is based on the concept that no light exit areas or activation points can be added in the visible area of the decorative layer, since otherwise the desired pattern is changed or eliminated. To compensate for the inhomogeneity of the light intensity of the light guides having a different number of first light exit areas in the visible area of the decorative layer, further light exit areas are added in the nonvisible area of the decorative layer. The number of first and second light exit areas of each light guide is thus equal or the number of first and second light exit areas of one light guide is only slightly greater or less than the number of first and second light exit areas of the other light guide. As a result, both light guides have a homogeneous light intensity in spite of different numbers of first light exit areas. A cladding part having a homogeneous light picture is thus provided.

For example, if one of the light guides in the visible area of the decorative layer has 30 first light exit areas and the other light guide has two first light exit areas in the visible area, then to homogenize the light intensity of the light guides, 28 second light exit areas are added in a nonvisible area of the decorative layer to the light guide which has two first light exit areas in the visible area. The light intensity of the two light exit areas in the visible area is thus brought to the same intensity level as in the case of the light guide having 30 first light exit areas in the visible area.

A visible area is understood in the present case as the area or the side or the surface of the decorative layer which is visible in the installed state of the cladding part. The visible area can also be referred to in the present case as the A surface, visible side, or visible surface. A nonvisible area of the decorative layer is understood in the present case as the area or the side or the surface of the decorative layer which is not visible in the installed state of the cladding part. The nonvisible area can also be referred to in the present case as the B surface, nonvisible side, or nonvisible surface. A bent-over edge area or edge section of the decorative layer, which is not visible in the installed state of the decorative layer, and/or a protrusion can thus form the nonvisible area of the decorative layer, for example. A lower side of the light guide, which faces away from an interior of the vehicle in the installed state of the cladding part and is therefore not visible, can likewise form a nonvisible area.

Slightly less or greater is understood in the meaning of the invention to mean that the sum of first and second light exit areas of one light guide is not greater than five, in particular not greater than three, more than the sum of first and second light exit areas of the other light guide.

In the meaning of the invention, n stands for a whole number beginning from 0 to infinity. In the meaning of the invention, the light exit area can also be referred to as a light point, light exit point, or activated surface of a light guide. In the meaning of the invention, the light guide can also be referred to as a light fiber.

The cladding part can be used for an interior of a vehicle or for an outside area of a vehicle. For example, the cladding part can be used for cladding an interior part, such as a vehicle door, an instrument panel, or a center console, and/or an exterior part, such as a bumper or an outside mirror. Furthermore, the cladding part can be used for a trim part or for cladding a furniture part.

In one advantageous embodiment, the number of first light exit areas of the light guides is different and/or the number of second light exit areas of the light guide is different. An inhomogeneity of the light intensity between the light guides is therefore equalized in the case of a different number of first light exit areas in the visible area of the decorative layer by providing second light exit areas in a nonvisible area of the decorative layer.

The number of first light exit areas and second light exit areas advantageously corresponds to the sum of first light exit areas and second light exit areas of a light guide. Therefore, the sum of first light exit areas and second light exit areas of one light guide is equal to or slightly less or greater than the sum of first light exit areas and second light exit areas of the other light guide.

In one advantageous embodiment, the decorative layer comprises a large number of light guides, wherein the number of first and second light exit areas of each light guide is equal, or wherein the number of first and second light exit areas of the light guides differs slightly. All light guides thus have the same light intensity and a homogeneous light picture is generated in the visible area of the decorative layer. Differ slightly is understood in the meaning of the invention to mean that the sums resulting from the first and second light exit areas of each light guide deviate from one another slightly, i.e. by not more than 5, in particular by not more than three.

In one advantageous embodiment, the light guides are sheathed by a light-opaque layer, wherein the first and second light exit areas are created by regionally removing and/or damaging the light-opaque layer. The regional removal of the light-opaque layer creates activated surfaces, from which the light can exit from the light guide, in particular can exit diffusely and/or radially. The regional removal and/or damaging of the light-opaque layer can be carried out by way of sandblasting and/or lasers.

In one advantageous embodiment, the decorative layer is in the form of a textile layer, wherein the light guides are woven into the textile layer. The textile layer is advantageously formed from warp and weft threads. The light guides are further advantageously woven into the textile layer such that the first light exit areas are arranged in a visible area of the decorative layer in the form of a textile layer and the second light exit areas are arranged in a nonvisible area of the decorative layer in the form of a textile layer.

In one advantageous embodiment, the light guides are woven as warp threads and/or weft threads into the textile layer.

In one advantageous embodiment, the first light exit areas and/or the second light exit areas are equal or different in size. The light intensity of a light guide can also be adjusted via the size of the light exit areas.

In one advantageous embodiment, multiple light guides are combined to form a bundle and are connected to a light source. The bundled light guides can be surrounded by a tube, which is referred to as a tentacle. The bundled light guides can be provided at the end side with an optical coupling point, which is referred to as a ferrule, via which the light source is connected and via which light is coupled into the light guides. The ferrule can be closed using an adhesive at its free end. The light source can be a light module, in particular an LED light module.

According to a further aspect of the invention, a method for homogenizing a light intensity of at least two light guides, which can be incorporated into a decorative layer of a cladding part according to embodiments of the invention, is proposed. In the method, initially the light guides are provided. Subsequently, n first light exit areas are introduced into each light guide such that the first light exit areas are arranged in a visible area of the decorative layer, in order to generate a light picture in particular. Subsequently, n second light exit areas are introduced into at least one of the light guides such that the second light exit areas are arranged in a nonvisible area of the decorative layer, and that the number of first and second light exit areas of the light guide at least corresponds to the number of first light exit areas of the other light guide, or that the number of first and second light exit areas of one light guide is slightly less or greater than the number of first and second light exit areas of the other light guide.

In one advantageous embodiment, n second light exit areas can be introduced into all light guides to homogenize the light intensity of the light guides, wherein the sum of first and second light exit areas of each light guide is equal, or wherein the sums resulting from the first and second light exit areas of each light guide deviate or differ slightly from one another.

In one advantageous embodiment, the first light exit areas and/or the second light exit areas are created by regionally removing and/or damaging a layer sheathing the light guides. The sheathing layer is a light-opaque layer. The sheathing layer can be removed by way of laser beams and/or sandblasting. The light coupled into the light guides exits diffusely and/or radially from the light exit areas.

According to a further aspect of the invention, a vehicle which comprises at least one cladding part according to embodiments of the invention is proposed.

A vehicle, a cladding part, a method for homogenizing a light intensity of light guides, and further features and advantages are explained in more detail hereinafter on the basis of exemplary embodiments, which are schematically shown in the figures.

DETAILED DESCRIPTION OF THE DRAWINGS

Figure 1:
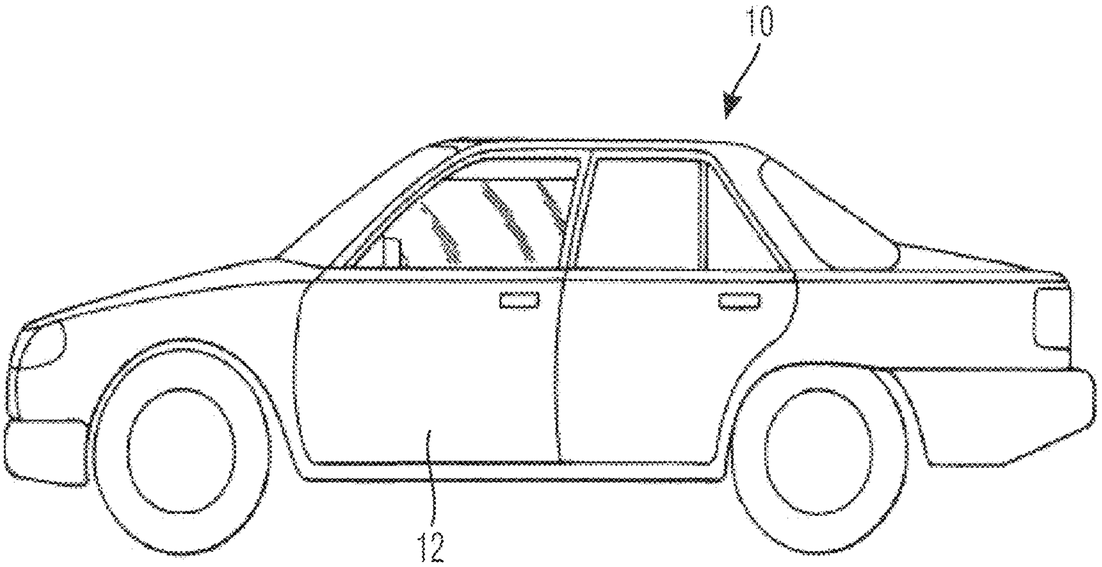
FIG. 1 shows a vehicle comprising a vehicle door having a cladding part.

FIG. 1 shows a vehicle 10 having a vehicle door 12. The vehicle 10 comprises a drive machine designed as an internal combustion engine and/or as an electric motor.

Figure 2:
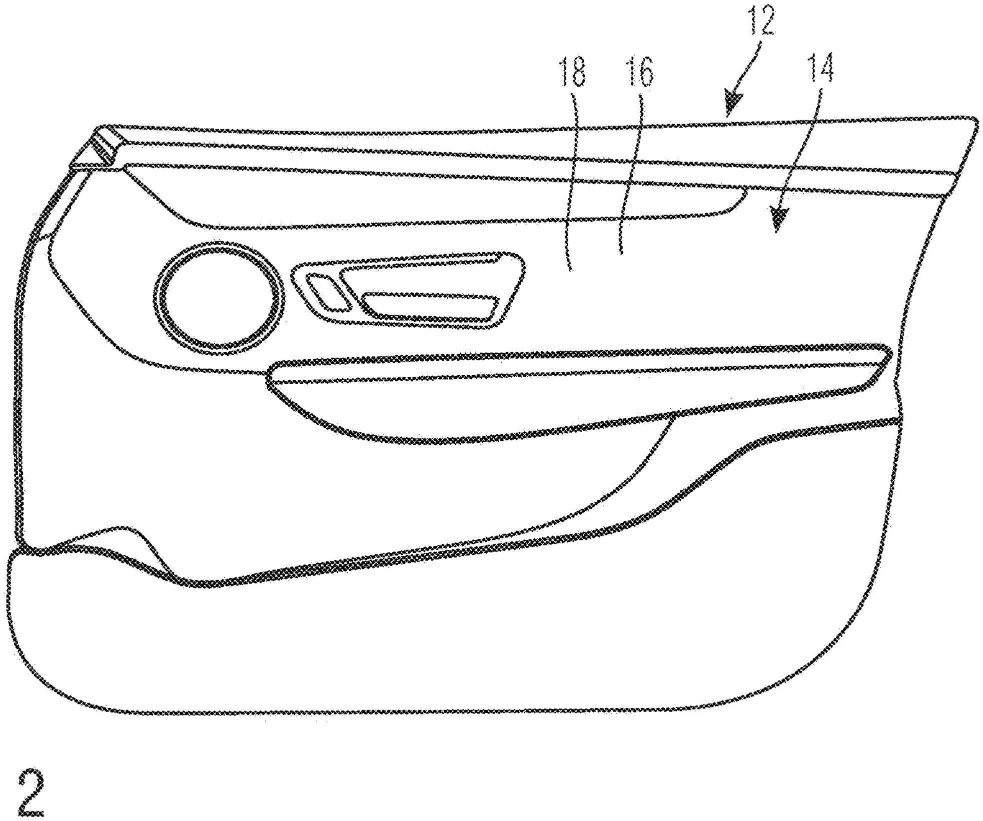
FIG. 2 shows an enlarged front view of the cladding part having a decorative layer in the form of a textile layer, wherein light guides are woven into the textile layer.
Figure 6:
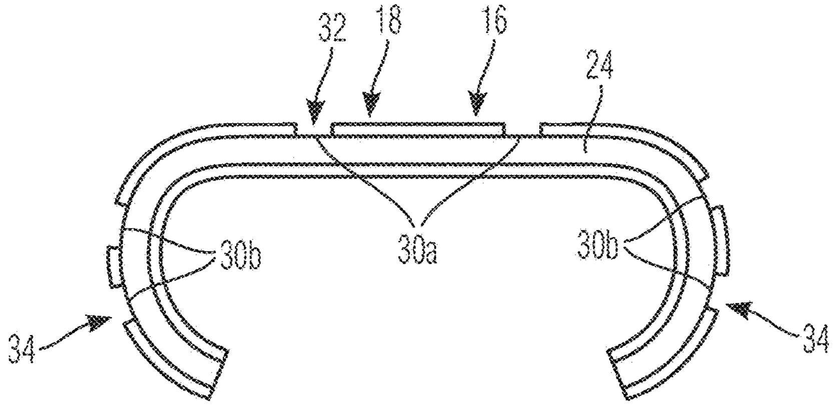
FIG. 6 shows a schematic front view of a decorative layer having the light guides from FIG. 5, which is bent over at the edge for installation in the cladding part.

The vehicle door 12 comprises a cladding part 14 (shown in FIG. 2), having a decorative layer 16. The decorative layer 16 comprises a visible area 32, which faces toward an interior of the vehicle 10 in the installed position of the cladding part 14, and a nonvisible area 34, which faces away from the interior in the installed position of the cladding part 14. The nonvisible area 32 of the decorative layer 16 is in the present case an edge section of the decorative layer 16, which is bent over for installation in the cladding part 14 and is therefore not visible in the installed state, as schematically shown in FIG. 6.

Figure 3:
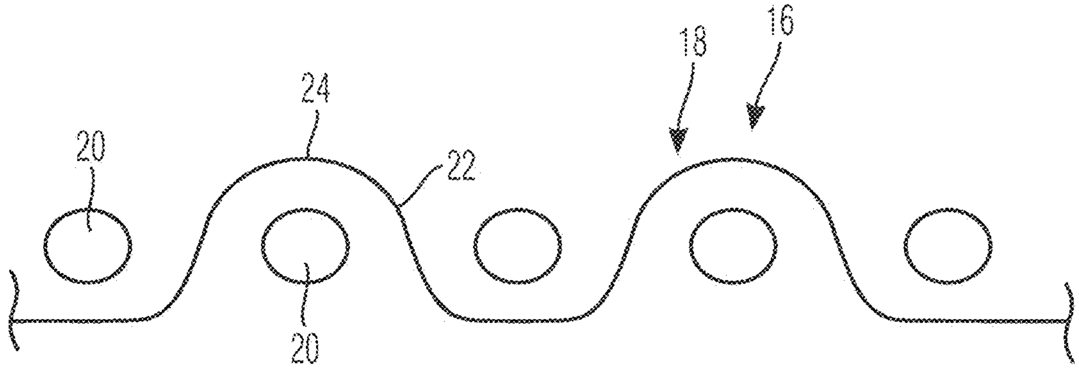
FIG. 3 shows an enlarged cross section through the textile layer having at least one woven-in light guide according to a first embodiment of FIG. 2.
Figure 5:
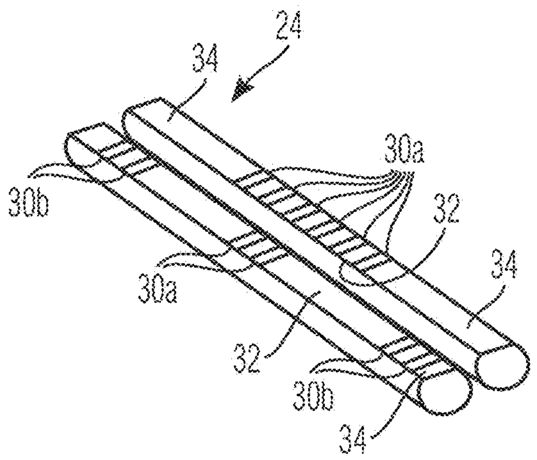
FIG. 5 shows a perspective view of two light guides of the textile layer from FIG. 2 having first and second light exit areas.

The decorative layer 16 is a textile layer 18, which is formed from warp threads 20 and weft threads 22 woven with one another, as is apparent from looking at FIGS. 3 and 5 together. Furthermore, light guides 24 are woven into the textile layer 18 as weft threads 22, and generate a light picture in the textile layer 18. It is also conceivable that the light guides 24 are woven as warp threads 20 or as warp threads 20 and as weft threads 22 into the textile layer.

Figure 4:
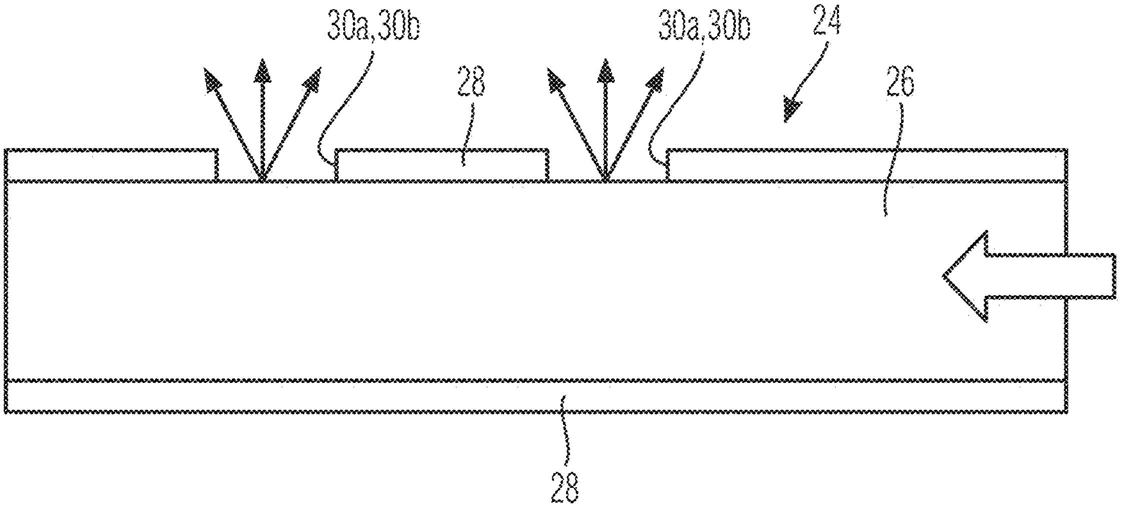
FIG. 4 shows an enlarged cross section through the light guide of FIG. 3 having light exit areas.

Each light guide 24 comprises a light channel 26, into which light is coupled at the end side via a light source (not shown), as illustrated in FIG. 4 by an arrow.

The light channel 26 is surrounded by a light-opaque layer 28 sheathing the light channel 26, which is referred to as cladding. First and second light exit areas 30*a*, 30*b*, which can also be referred to as an activated surface, are created by regionally removing and/or damaging the light-opaque layer 28, for example, by way of laser beams and/or sandblasting. In the area of the first and second light exit areas 30*a*, 30*b*, the light coupled into the light channel 26 exits diffusely from the light guide 24, as schematically shown in FIG. 4 by the arrows.

As is apparent in FIG. 5, the light guides 24 have a different number of first light exit areas 30*a* in the visible area 32 of the decorative layer 16 in order to generate the light picture in the textile layer 18. Since the light source couples an equal amount of light into each light guide 24, a light guide 24 having few first light exit areas 30 has a higher light intensity per first light exit area 30*a* than the first light exit areas 30*a* of a light guide 24 having many first light exit areas 30*a*. Some first light exit areas 30 thus luminesce more strongly than other first light exit areas 30*a*.

To equalize the inhomogeneity of the light intensity between the light guides 24 having different numbers of first light exit areas 30*a*, it is necessary to equalize the number of light exit areas. Since no further first light exit areas 30*a* can be added in the visible area 32 of the decorative layer 16, since otherwise the desired light picture will be changed or eliminated, second light exit areas 30*b* are added in the nonvisible area 32 of the decorative layer 16, as is apparent in FIGS. 5 and 6.

As FIGS. 5 and 6 show by way of example, one of the light guides 24 has two first light exit areas 30*a* in the visible area 32 and the other light guide 24 has six first light exit areas 30*a* in the visible area 32. To homogenize the light intensity of the two light guides 24, four second light exit areas 30*b* are added in the nonvisible area 32, as is apparent in FIG. 6. Each light guide 24 thus has the same number of light exit areas 30*a*, 30*b*.

Figure 7:
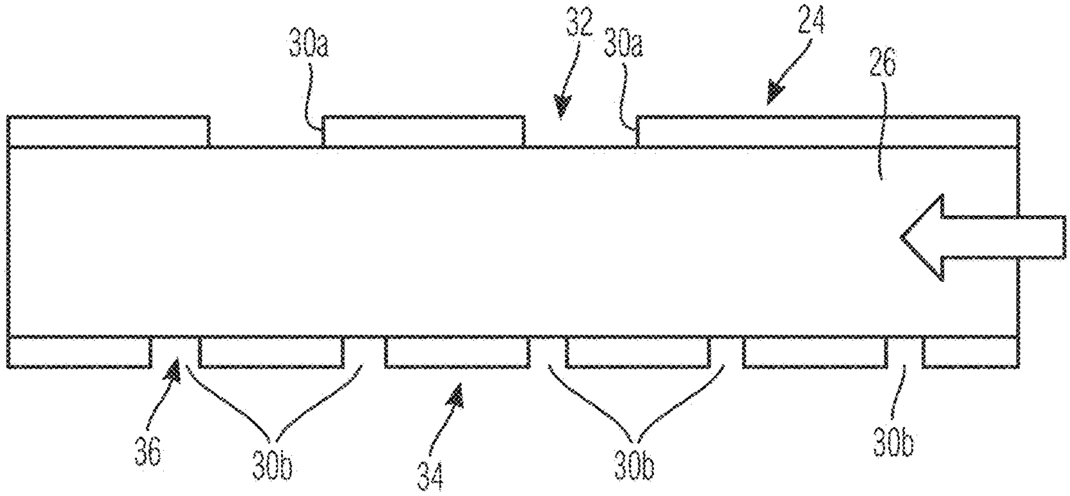
FIG. 7 shows an enlarged cross section through a light guide according to a second embodiment.

FIG. 7 shows a second embodiment of the light guide 24, which differs from the first embodiment in that to homogenize the intensity of the light guides 24, the second light exit areas 30*a* are introduced into a lower side 36 of the light guide 24 and therefore into the nonvisible area 32 of the decorative layer 16.

The cladding part 14 is distinguished in that the light intensity is homogenized between the light guides 24 in that second light exit areas 30*b* are added in a nonvisible area 32 of the decorative layer 16 in order to equalize the intensity level of the light guides 24.

LIST OF REFERENCE SIGNS

10 vehicle
12 vehicle door
14 cladding part
16 decorative layer
18 textile layer
20 warp threads
22 weft threads
24 light guide
26 light channel
28 light-opaque layer
30*a* first light exit area
30*b* second light exit area
32 visible area
34 nonvisible area
36 lower side

The invention claimed is:

1. A cladding part for a vehicle, the cladding part comprising:

a decorative layer having at least two light guides into which light can be coupled, wherein:

each light guide comprises n first light exit areas for exit of coupled-in light in a visible area of the decorative layer and comprises n second light exit areas for exit of the coupled-in light in a nonvisible area of the decorative layer, and a number of first and second light exit areas of a first light guide is equal to a number of first and second light exit areas of a second light guide, or the number of first and second light exit areas of the first light guide is slightly less or greater than the number of first and second light exit areas of the second light guide.

2. The cladding part according to claim 1, wherein at least one of:

a number of first light exit areas of the light guides is different, or a number of second light exit areas of the light guides is different.

3. The cladding part according to claim 1, wherein:
a number of first and second light exit areas of each light guide is equal or the number of first and second light exit areas of the light guides differs slightly.

4. The cladding part according to claim 1, wherein:
the light guides are sheathed by a light-opaque layer, and the first and second light exit areas are created by at least one of regionally removing or damaging the light-opaque layer.

5. The cladding part according to claim 1, wherein:
the decorative layer is in a form of a textile layer, and the light guides are woven into the textile layer.

6. The cladding part according to claim 1, wherein multiple light guides are combined to form a bundle and are connected to a light source.

7. A vehicle comprising the cladding part according to claim 1.

8. The cladding part according to claim 5, wherein the light guides are woven as warp threads into the textile layer.

9. The cladding part according to claim 5, wherein the light guides are woven as weft threads into the textile layer.

10. The cladding part according to claim 5, wherein the light guides are woven as warp threads and as weft threads into the textile layer.

11. A method for homogenizing a light intensity of at least two light guides, which can be incorporated into a decorative layer of a cladding part, the method comprising:
providing the light guides;
introducing n first light exit areas into each light guide such that the first light exit areas are arranged in a visible area of the decorative layer; and
introducing n second light exit areas each light guide such that the second light exit areas are arranged in a nonvisible area of the decorative layer, wherein:
a number of first and second light exit areas of a first light guide corresponds to a number of first light exit areas of a second light guide, or
the number of first and second light exit areas of the first light guide is slightly less or greater than the number of first and second light exit areas of the second light guide.

12. The method according to claim 11, wherein at least one of the first light exit areas or the second light exit areas are created by at least one of regionally removing or damaging a layer sheathing the light guides.

* * * * *